3,198,772
POLYMERIZATION OF VINYL MONOMERS
Rajendra N. Chadha, Takoma Park, Md., assignor to W. R. Grace & Co., New York, N.Y., a corporation of Connecticut
No Drawing. Filed Jan. 9, 1962, Ser. No. 165,227
2 Claims. (Cl. 260—78.4)

This invention relates to a polymerization process. More particularly it is directed to stabilizing the polymerization of vinyl monomers carried out in the presence of pigments.

A copending application having Serial No. 101,328, filed April 7, 1961, now U.S. 3,117,112, and assigned to the same assignee, relates a method of polymerizing vinyl monomers in the presence of a catalyst consisting essentially of an aluminum alkyl and free oxygen at low temperatures. In using said catalyst system however, it has been found that when the polymerization is performed in the presence of inorganic pigments formed from oxides of transition metals having atomic numbers 21 through 28 inclusive, the reaction is violent and uncontrollable even in the absence of the free oxygen cocatalyst. Thus if the aluminum alkyl is added to the monomer-pigment reactants prior to free oxygen the "pot life" or stability of the system is greatly decreased and polymerization occurs in an uncontrollable fashion immediately. No explanation has been forthcoming to date as to the reason for such a severe reaction nor does applicant wish to set forth any theory therefor. Suffice it to say that there is some synergistic reaction between the aluminum alkyl and the oxides of transition metals having atomic numbers 21-28 which catalyzes the polymerization of vinyl monomers. However, because of said instability, polymer formed by the aforesaid process cannot be colored while being formed thus necessitating several steps subsequent to the polymerization in order to accomplish same.

Thus one object of the instant invention is to polymerize vinyl monomers in the presence of a pigment formed from oxides of transition metals having atomic numbers 21 through 28 with a catalyst consisting essentially of an aluminum alkyl and free oxygen. Another object is to provide a stabilized catalyst system for vinyl monomers when polymerized in the presence of the aforesaid transition metal oxide pigments. Yet another object is to provide a catalyst system for vinyl monomers which will retard polymerization in the presence of pigments to the extent that the polymerization step is controllable. Other objects will become apparent from reading hereinafter.

Surprisingly it has now been found that vinyl monomers can be polymerized at a rapid rate in good yield without a violent reaction in the presence of a pigment formed from oxides of transition metals having atomic numbers 21 through 28 with a catalyst consisting essentially of free oxygen and a complex preformed by admixing an aluminum alkyl compound with butyl acrylate. The polymerization proceeds mildly and the polymer yield is unaffected.

As used in this specification the term "vinyl" is intended to mean the group $>C=CH_2$. In this group, there is generally a substituent, thus

in which R is, typically, H or a lower alkyl (i.e., 1 to 8 carbons). However, R can also be an aliphatic group, e.g., an itaconic acid residue:

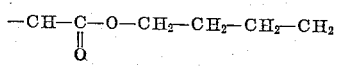

Thus vinyl monomers include but are not limited to members of the group consisting of vinyl esters, esters of alkylacrylic acids, and vinyl nitriles of the formula

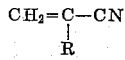

in which R is hydrogen or an alkyl containing 1 to 8 carbon atoms.

By the term "aluminum alkyl compound" as used throughout this invention is meant a compound having the general formula:

wherein R is an alkyl or hydrogen and R' is an alkyl, all of said alkyl groups containing 1 to 8 carbon atoms.

The preformed complex of the aluminum alkyl compound and butyl acrylate is combined in a mole ratio of 1:1.

The ratio of the aluminum alkyl compound-butyl acrylate complex to free oxygen is not critical. This invention is operable within a broad range of complex: oxygen mole ratios. A mole ratio range of complex: oxygen of 1:0.0001 to 10000 or more is operable. Air can be substituted for oxygen in the catalyst system of this invention as long as sufficient air is used to meet the minimum free oxygen necessary in the complex to oxygen mole ratio. Thus it is possible to expose the vinyl monomer-pigment-catalyst complex to ambient conditions in the presence of air and thereby polymerize the vinyl monomer.

The polymerization reaction of the instant invention is ordinarily performed at atmospheric pressure. However the reaction is operable at sub or superatmospheric pressure.

The following examples are recited to more fully explain but expressly not to limit the invention.

In all the examples diisobutyl aluminum hydride was used as the aluminum alkyl compound. However other aluminum alkyls such as triethyl aluminum, trioctyl aluminum or diethyl aluminum hydride are equally operable.

*Example I*

5.7 cc. n-butyl acrylate, 2.6 cc. vinyl propionate, 0.93 gm. polybutyl methacrylate and 0.93 gm. of pure yellow iron oxide were charged to a test tube and mechanically mixed until the polymer went into solution and the yellow iron oxide pigment was uniformily dispersed. The function of the polybutyl methacrylate polymer is to increase the viscosity of the mixture and decrease the evaporation of the monomer prior to its being polymerized when exposed to air or free oxygen. A separate test tube was deoxygenated by heating in an oven at 180° C. for 24 hours, rubber stoppered and then flushed with purified nitrogen for three hours at 5 p.s.i. pressure through hypodermic needles inserted in the stopper for an inlet and outlet. The hypodermic needles were removed from the deoxygenated test tube and 4.0 cc. of the aforesaid mixture were transferred thereto by means of a deoxygenated hypodermic syringe. 1.0 cc. of a catalyst complex, prepared in a test tube, deoxygenated as hereinabove, by mechanically mixing at room temperature 5 cc. of butyl acrylate and 6.4 cc. of diisobutyl aluminum hydride was slowly charged by a deoxygenated hypodermic syringe to the deoxygenated test tube containing the 4.0 cc. of the mixture. No polymerization occurred in the oxygen-free system. After one-hour 1.0 cc. of the contents of the tube were removed by a deoxygenated hypodermic syringe and deposited on a metal plate in the atmosphere. Polymerization initiated immediately and within 15 minutes a firm layer of solid polymer product was formed on the plate.

*Example II*

The procedure of Example I was repeated except that the mixture consisted of 5.7 cc. n-butyl acrylate, 3.33 cc. ethyl acrylate, 1.0 gm. polybutyl methacrylate, 0.5 gm. polyvinyl acetate and 1.0 gm. of titanium dioxide as the pigment. The polymeric material was added to increase the viscosity of the mixture. 4.0 cc. of the mixture was transferred to a deoxygenated tube and 1 cc. of the catalyst complex of Example I was slowly added therein. No polymerization occurred. After one hour 1 cc. of the contents of the tube were deposited on a metal plate in air by means of a deoxygenated hypodermic syringe. A firm layer of solid polymer product formed on the plate.

The following examples show the instability of the system when the transition metal oxide pigment is present and the catalyst is not in complex form.

*Example III*

100 cc. butyl acrylate, 40 cc. vinyl propionate, 14 gm. polybutyl methacrylate and 14 gm. of yellow iron oxide as pigment were mixed in a Waring Blendor until the polymer dissolved and the pigment was uniformily dispersed. The mixture was charged under oxygen free conditions to a spray gun container which had previously been deoxygenated with purified nitrogen. 14 cc. of diisobutyl aluminum hydride was added to the deoxygenated container and immediately a violent reaction took place resulting in a rubber polymer mass containing traces of charcoal.

*Example IV*

100 cc. butyl acrylate, 50 cc. ethyl acrylate, 15 gm. polybutyl methacrylate, 7.5 gm. polyvinyl acetate and 15 gm. of titanium dioxide as pigment were mixed in a Waring Blendor until the polymer dissolved. The mixture was charged under oxygen free conditions to a deoxygenated spray gun container. 14 cc. of diisobutyl aluminum hydride was charged to the container and an immediate violent reaction resulted in the formation of a rubbery polymer.

A comparison of Example I with Example III and Example II with Example IV shows the increased stability obtained by complexing the aluminum alkyl with butyl acrylate.

The catalyst complex to monomer mole ratio can vary within wide limits. A catalyst complex:monomer mole ratio of 1:1 to 30 respectively is operable; however, a mole ratio of 1:1 to 10 is preferred.

Vinyl monomers which can be polymerized by the catalyst of the instant invention include but are expressly not limited to vinyl acetate, methyl methacrylate, vinyl butyrate, vinyl propionate, vinyl oleate, vinyl-2-ethyl hexoate, vinyl isodecanoate methyl acrylate, ethyl acrylate, n-butyl acrylate, 2-ethyl hexyl acrylate, ethyl methacrylate, hexyl methacrylate, n-butyl methacrylate, lauryl methacrylate, di-n-butyl itaconate, ethylene glycol dimethacrylate, 1,3,-acrylonitrile, methacrylonitrile, and tridecyl acrylate.

It should be understood that it is not necessary for the pigment to be present in order to polymerize vinyl monomers with the catalyst of this invention.

To show the operability of the oxygen-aluminum alkyl complex catalyst system in the absence of oxides of transition metals having atomic numbers 21–28 inclusive the following runs were made.

*Example V*

3.5 cc. n-butyl acrylate, 0.5 cc. alkyl acrylate, 0.25 cc. vinyl acetate and 0.5 gm. polybutyl methacrylate were charged to a test tube and mechanically mixed at room temperature until the polymer went into solution. A separate test tube was deoxygenated by heating in an oven at 180° C. for 24 hours, rubber stoppered and then flushed with purified nitrogen for 3 hours at 5 p.s.i. pressure through hypodermic needles inserted in the stopper as a gas inlet and outlet. The hypodermic needles were removed from the rubber stopper and 4.0 cc. of the aforesaid mixture were transferred to the deoxygenated test tube by a deoxygenated hypodermic syringe. 1.0 cc. of a catalyst complex, consisting of butyl acrylate and diisobutyl aluminum hydride in a 1:1 mole ratio prepared as in Example VII hereinafter, was slowly charged by a deoxygenated hypodermic syringe to the deoxygenated test tube containing 4.0 cc. of the mixture. No polymerization occurred in the oxygen free system. After two hours 1.0 cc. of the tube contents were removed by a deoxygenated hypodermic syringe and deposited as a layer on a plate in air. Polymerization occurred immediately resulting in a clear hard film.

*Example VI*

The procedure and reactants of Example V were employed except that 0.75 gm. of polybutyl methacrylate instead of 0.5 gm. were used. After adding 1.0 cc. of the butyl acrylate-diisobutyl aluminum hydride complex in a 1:1 mole ratio to the deoxygenated test tube containing 4.0 cc. of the mixture as in Example V, a deoxygenated syringe was used to remove 1.0 cc. of the tube contents and deposit same as a layer on a plate in air. The layer was immediately drawn by a 6 mil Bird Film Applicator, manufactured by Bird and Son Inc., East Walpole, Massachusetts. Polymerization started immediately and after 15 minutes a clear, uniform, hard film having a thickness of 1–1.25 mils resulted.

The catalyst complex of the present invention can be made in the following manner.

*Example VII*

A 50 cc. test tube was deoxygenated in an oven at 120° C. for 2 hours and sealed with a rubber stopper. Two hypodermic needles as gas inlet and outlet were then inserted into the tube through the stopper and nitrogen was passed through the tube. 5 cc. of butyl acrylate (0.349 mole) was injected into the tube by hypodermic syringe and the tube was then cooled in an ice water bath. 6.4 cc. of diisobutyl aluminum hydride (0.349 mole) was slowly injected into the tube by hypodermic syringe. The resulting solution had a volume of 10.25 cc. and turned yellow on the formation of the complex.

The following example shows the operability of the catalyst in uncomplexed form in the presence of a pigment which is not an oxide of a transition metal having atomic numbers 21 through 28.

*Example VIII*

4.4 cc. n-butyl acrylate, 1.4 cc. allyl acrylate, 0.3 cc. vinyl acetate, 1.2 g. maleic anhydride and 5.0 g. of pigment grade zinc oxide were charged to a test tube and mechanically mixed until the pigment was uniformily dispersed. A separate test tube was deoxygenated by heating in an oven at 180° C. for 24 hours, rubber stoppered and flushed with purified nitrogen for three hours at 5 p.s.i. pressure through hypodermic needles inserted as inlet and outlet in the stopper. The hypodermic needles were removed from the rubber stopper and 4.50 cc. of the aforesaid mixture were transferred to the deoxygenated test tube by a deoxygenated hypodermic syringe. 0.5 cc. of diisobutyl aluminum hydride was added by a deoxygenated hypodermic syringe to the tube containing the mixture. No polymerization occurred in the oxygen free system. After one hour, 1 cc. of the mixture was deposited by a deoxygenated syringe on a metal plate under ambient conditions in the presence of air. Polymerization initiated immediately and within 20 minutes a light yellow colored stable polymeric film formed.

I claim:

1. In the process of polymerizing a member of the vinyl monomer group consisting of vinyl acetate, vinyl butyrate, vinyl propionate, vinyl oleate, vinyl-2-ethyl hexoate, vinyl isodecanoate, methyl methacrylate, ethyl methacrylate, hexyl methacrylate, n-butyl methacrylate, lauryl methacrylate, ethylene glycol dimethacrylate, methyl acrylate, ethyl acrylate, 2-ethyl hexyl acrylate, tridecyl acrylate, allyl acrylate, di-n-butyl itaconate, acrylonitrile, and methacrylonitrile in the presence of a catalyst consisting essentially of free oxygen and an aluminum alkyl compound of the formula:

in which R is a member of the group consisting of hydrogen and an alkyl and R' is an alkyl, all of said alkyls containing 1 to 8 carbon atoms, which comprises admixing said vinyl monomer group member with said aluminum alkyl compound and exposing said mixture to free oxygen, the improvement whereby the mixture is stabilized to thermal polymerization prior to exposure to free oxygen by complexing the aluminum compound in a 1:1 mole ratio with butyl acrylate in an oxygen free atmosphere prior to admixing it with said vinyl monomer group member.

2. The process according to claim 1 wherein the mixture contains a pigment consisting of an oxide of a transition metal having an atomic number of 21 to 28 inclusive.

References Cited by the Examiner
UNITED STATES PATENTS

| | | | |
|---|---|---|---|
| 2,129,664 | 9/38 | Barrett et al. | 260—63 |
| 2,868,771 | 1/59 | Ray et al. | 260—94.9 |
| 2,946,778 | 7/60 | Ke et al. | 260—93.7 |
| 3,047,554 | 7/62 | Gay | 260—92.8 |
| 3,052,661 | 9/62 | Benning | 260—89.1 |
| 3,053,822 | 9/62 | Benning | 260—89.1 |
| 3,117,112 | 1/64 | Mirable et al. | 260—88.1 |

JOSEPH L. SCHOFER, *Primary Examiner.*

LOUISE P. QUAST, JOSEPH R. LIBERMAN, WILLIAM H. SHORT, *Examiners.*